March 12, 1935. W. G. LAWSON Re. 19,496

APPARATUS FOR MOLDING ARTICLES FROM PLASTIC MATERIAL

Original Filed Nov. 8, 1933

Inventor
Wilfrid G. Lawson
By Eaton & Avery
Attys

Reissued Mar. 12, 1935

Re. 19,496

UNITED STATES PATENT OFFICE 19,496

APPARATUS FOR MOLDING ARTICLES FROM PLASTIC MATERIAL

Wilfrid G. Lawson, Akron, Ohio, assignor to The B. F. Goodrich Company, New York, N. Y., a corporation of New York Original No. 1,969,083, dated August 7, 1934, Serial No. 697,153, November 8, 1933. Application for reissue November 28, 1934, Serial No. 755,199

6 Claims. (Cl. 18—44)

This invention relates to apparatus for molding articles from plastic materials and is especially useful in branding or marking rubber or other plastic articles as they are formed in a mold.

The principal objects of the invention are to provide accuracy and neatness, and to provide interchangeability of design.

Other objects will appear from the following description and the accompanying drawing.

Figure 1:
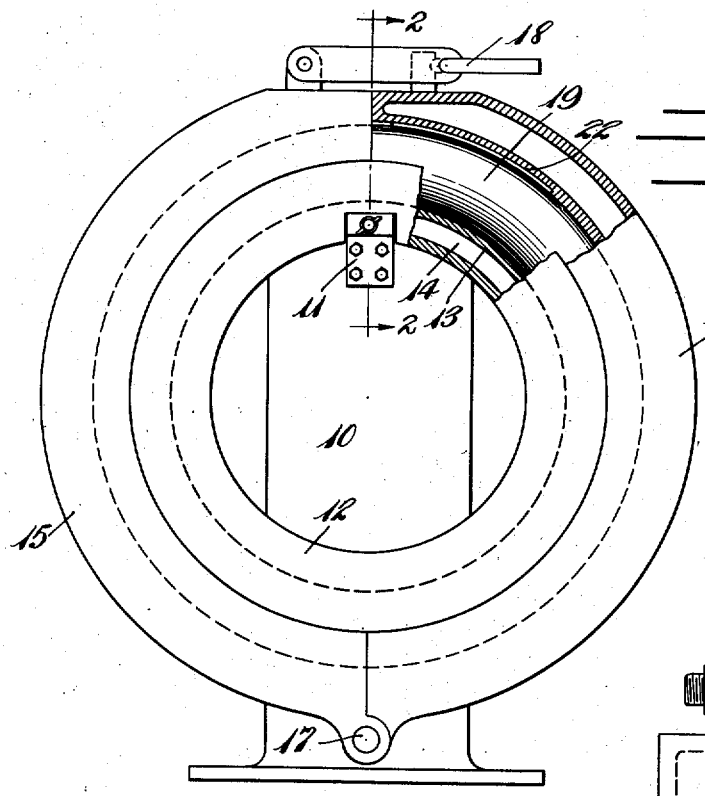
Fig. 1 is a front elevation of a vulcanizing mold for tire inner tubes, the inner tube being shown in place, parts being broken away to show the interior and the tube.
Figure 2:
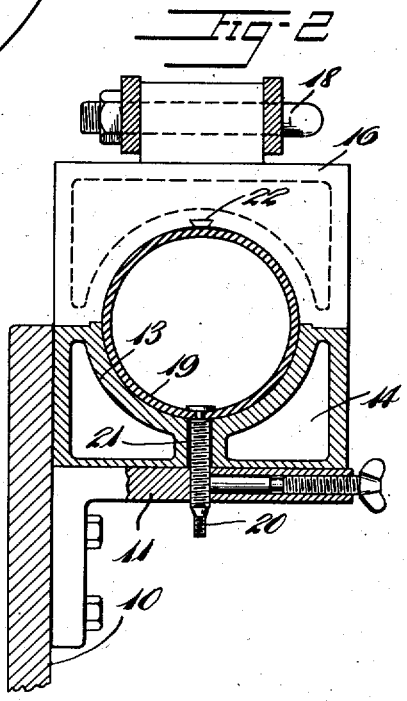
Fig. 2 is a section taken on line 2—2 of Fig. 1.
Figure 3:
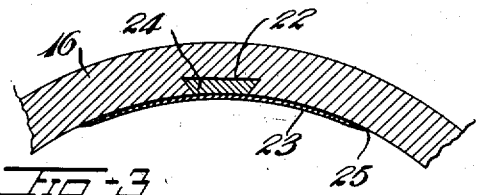
Fig. 3 is an enlarged detail view showing a portion of the mold wall with a branding device attached thereto.
Figure 4:
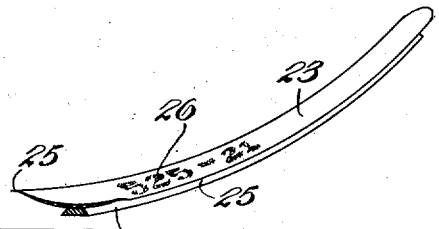
Fig. 4 is a perspective view of the branding device.

Referring to the drawing, a molding device such as is used for vulcanizing molded inner tubes has been chosen to illustrate the invention, and comprises a standard 10 which supports a bracket 11 for holding an annular mold member 12. Mold member 12 is formed with a semi-circular peripheral groove 13 for forming the rim contacting portion of the tube, and is chambered as at 14 to receive a heating medium.

The complementary part of the mold comprises a pair of semi-circular mold members 15, 16, hinged at 17 to each other and provided at their opposite ends with a locking device 18. The mold members 15, 16, are formed with molding cavities forming a continuation of each other and complemental to the groove 13 to define a closed toroidal cavity when the mold is assembled.

When an inner tube 19 is to be vulcanized, the mold members are assembled thereabout, the valve 20 of the tube extending through an opening 21 provided therefor so that the tube may be inflated to fill the mold.

In order to brand the tube with identifying indicia it is customary to provide one or more of the mold members with either raised or sunk lettering to impress the tube. Where it is desired to provide different indicia on tubes of the same size, this would ordinarily require different molds. In order to obviate this difficulty, one of the mold parts 16 is formed with a dove tailed recess 22 extending from the parting of the members 15, 16, along a face of the member 16 and a removable branding plate 23, having on its back a dove-tailed key 24, adapted to slidably engage the recess, is provided to be detachably mounted in the mold.

The branding plate 23 is formed to the general contour of the surface of the mold to which it is attached and preferably is made of spring metal. In order to provide against flow of the plastic material between the branding plate and the mold, the margins 25 of the branding plate are tapered to a thin edge and are turned back toward the supporting mold surface so as to cause the edges to contact therewith under slight pressure when the dove tail 24 is inserted in the recess 22. The plate is formed with indicia 26, either in relief or intaglio to form the desired brand in the rubber.

While an inner tube mold has been chosen to illustrate the invention, it will be understood that the device is adapted to use in molds of other shapes. The inner tube mold presents greater difficulties, due to its doubly curved surface, than molds having flat faces.

Under the pressure of vulcanization those portions of the branding plate back of the margins may be forced to contact with the mold.

I claim:

1. The combination with a mold for forming a rubber article, of a thin metal branding plate, formed to the general shape of a surface of the mold, and having its margins turned toward the supporting mold surface to prevent the flow of plastic material thereunder.

2. The combination with a mold for forming a rubber article, of a thin metal branding plate formed to the general shape of a surface of the mold, said mold being provided with means for detachably holding the plate against its surface, and said plate having its margins turned toward the supporting mold surface to prevent flow of plastic material thereunder.

3. A vulcanizing mold having a molding surface curved in two directions, and detachably seated thereon a thin metal branding plate, said plate being curved to conform to the surface and having its margins turned toward said surface to prevent the flow of material thereunder.

4. A vulcanizing mold having a molding surface curved in two directions, and detachably seated thereon a spring metal plate, said plate being curved to conform its margins to the contour of the mold surface, other parts of the plate being normally out of contact therewith but conformable thereto when subjected to pressure.

5. A vulcanizing mold having a molding surface smoothly curved in two directions throughout a certain area and, detachably seated thereon, a flexible insert plate of less extent than said area in all directions and, when in unstrained condition, of a form such that as it is presented to the said molding surface opposite margins of the insert plate will engage the molding surface in advance of portions of the plate between said margins.

6. A vulcanizing mold having a concave molding surface smoothly curved in two directions throughout a certain area and, detachably seated thereon, a flexible insert plate of less extent than said area in all directions and, when presented to said surface in its general functioning position but in unstrained condition, less sharply curved in at least one direction, than said surface.

WILFRID G. LAWSON.